United States Patent [19]
Reich et al.

[11] Patent Number: 5,259,998
[45] Date of Patent: Nov. 9, 1993

[54] METHOD FOR CASTING DISSOLVABLE OPHTHALMIC SHIELDS IN A MOLD

[75] Inventors: Cary Reich, Laguna Hills; Jean Toner-Webb, Irvine, both of Calif.

[73] Assignee: Chiron Ophthalmics, Inc., Irvine, Calif.

[21] Appl. No.: 770,867

[22] Filed: Oct. 4, 1991

[51] Int. Cl.$^5$ ............................................. B29C 11/00
[52] U.S. Cl. .................................. 264/1.1; 264/1.4; 264/2.1; 264/22; 264/28; 264/101; 264/310
[58] Field of Search ............... 264/1.1, 1.4, 2.6, 22, 264/26, 28, 2.1, 101, 310

[56] References Cited

U.S. PATENT DOCUMENTS

| | | |
|---|---|---|
| 4,164,559 | 8/1979 | Miyata et al. |
| 4,223,984 | 9/1980 | Miyata et al. |
| 4,264,155 | 4/1981 | Miyata |
| 4,505,855 | 3/1985 | Bruns et al. |
| 4,581,030 | 4/1986 | Bruns et al. |
| 4,650,616 | 3/1987 | Wajs ........................ 264/2.6 |
| 4,664,857 | 5/1987 | Nambu ...................... 264/28 |
| 4,879,072 | 11/1989 | Bourset et al. ............ 264/2.6 |
| 5,114,627 | 5/1992 | Civerchia ................... 264/28 |

*Primary Examiner*—Jeffery Thurlow
*Assistant Examiner*—Mathieu Vargot
*Attorney, Agent, or Firm*—Rothwell, Figg, Ernst & Kurz

[57] ABSTRACT

A method for making a biosoluble collagen or gelatin ophthalmic shield, which optionally contains a pharmaceutically active agent, by casting collagen or gelatin in a mold; chilling the mold with the collagen or gelatin shield until the shield is strong enough to allow the mold to be opened without deforming the shield in one half of the mold; drying the collagen or gelatin shield while it is still in the mold; and then cross-linking the collagen or gelatin shield to achieve the desired solubility. The resulting shield can be worn comfortably in the eye and leaves no observable material after complete dissolution and drug release.

24 Claims, No Drawings

METHOD FOR CASTING DISSOLVABLE OPHTHALMIC SHIELDS IN A MOLD

BACKGROUND OF THE INVENTION

This invention relates to a novel method of casting a dissolvable ophthalmic shield. The novel method provides enhanced control of the solubility, comfort and clarity characteristics of the resulting ophthalmic shield.

Methods for preparing collagen soft contact lenses are well-known, and they vary in the specific steps taken to produce the lens. In general, the first step is to extract the collagen from animal hide, such as steer hide or pigskin, by dissolving the hide with acids, bases, salts or by enzyme extraction. The collagen also can be recovered in fiber form, in which the collagen is not dissolved but is recovered from an aqueous dispersion.

If a method in which the collagen is dissolved is utilized, the solution is centrifuged to separate the collagen gel and remove any unwanted debris. The collagen gel then can be placed in a mold where it is centrifuged to make the collagen gel spread evenly across the mold surface to form a film. Alternatively, the collagen gel can be centrifuged to remove unwanted bubbles before being placed into a mold to be fixed or cross-linked.

The fixing process or cross-linking of the collagen gel stabilizes the collagen to prevent it from dissolving. Cross-linking can be carried out by irradiation with gamma or ultraviolet rays or by chemical means or by a combination of both. In conventional methods, the cross-linking process is carried out while the collagen gel is in the mold. The collagen gel can be wet or dry at the time of cross-linking. Once the cross-linking process has been completed, the finished lens is clear, flexible and biostable (non-dissolvable in physiological fluids). See, for example, U.S. Pat. Nos. 4,223,984; 4,264,155; 4,505,855 and 4,581,030. Fixing or cross-linking also transforms the collagen gel into a flexible, plastic film which has the dimensional stability necessary to allow it to be removed from the mold. The physical strength, tear-resistance and biostability of the resulting collagen shield increases with increased cross-linking.

In addition to its use in forming biostable contact lenses, collagen can be used to form a soluble optical insert which acts as a sustained delivery device for a pharmaceutically active agent. The optical insert can be placed in the eye, such as in the inferior fornix or the inferior cul de sac, where it slowly dissolves under physiological conditions, releasing the drug.

Cross-linked collagen generally must be chemically modified before it becomes significantly soluble under physiological conditions. Such chemical modification includes, for example, acylation of the amino groups of the collagen with acetic anhydride or other anhydrides, such as succinic anhydride, or esterification of the carboxyl groups with acidified alcohol such as methanol or ethanol. See, for example, U.S. Pat. No. 4,164,559, relating generally to chemical modification of collagen.

Currently, for drug delivery to the eye, the main dosage forms are drops and ointments. For both forms, the duration of the therapeutic effect is short, and repeated doses are required during the course of therapy because the drugs are rapidly washed out by reflex tear flow. In addition, strict patient compliance is required to achieve the desired therapeutic effect.

Although there exists a method for preparing a biosoluble ophthalmic membrane containing an ophthalmic drug, which can be inserted into the eye, the ophthalmic membrane is not a shield that can be comfortably worn on the eye. Further, current methods where collagen is used to make the soft contact lenses lead to the formation of a biostable lens. Therefore, a need exists for a method of preparing an ophthalmic membrane with defined geometries that can optionally contain an ophthalmic drug that will dissolve under physiological conditions while being comfortably worn on the eye.

SUMMARY OF THE INVENTION

The present invention resides in a novel method of preparing a biosoluble ophthalmic shield, made from collagen or gelatin, to be placed on the eye. Optionally, the ophthalmic shield can contain a pharmaceutically active ophthalmic agent.

The collagen or gelatin is formed into a viscous gel. The gel is placed into a double-sided mold, and the mold then is chilled to impart to the collagen or gelatin a sufficient dimensional stability to permit the mold to be opened without deforming the resulting ophthalmic shield.

After the chilling process has been completed, the double-sided mold is opened, and the ophthalmic shield is dried. The dried ophthalmic shield possesses sufficient strength and dimensional stability such that it can be removed from the mold prior to cross-linking, if desired. Preferably, the dry ophthalmic shield is left in the mold during cross-linking. The shield is partially cross-linked to a predetermined extent to obtain the desired solubility in the eye. Any of the standard methods of cross-linking can be used to fix the ophthalmic shield, such as by irradiation, by chemical means or by heat treatment, depending on the material used and the finished product needs. This process enables the preparation of a molded ophthalmic shield with lower buffer or salt additives than in prior processes and with excellent visual characteristics due to the double-sided mold casting, chilling and drying processes.

The finished product of this novel method is an ophthalmic shield that dissolves at a controlled rate under physiological conditions of the eye. The ophthalmic shield can be comfortably worn on the eye, and the shield slowly dissolves leaving no residue in the eye. Ophthalmic shields produced by this method are ideally suited as temporary protective shields for use following eye surgery or injury and as ophthalmic drug delivery devices.

DETAILED DESCRIPTION OF THE INVENTION

The present invention relates to a novel method for making a biosoluble ophthalmic shield made from collagen or gelatin that can be placed on the eye. Optionally, the ophthalmic shield can contain an ophthalmic drug which is slowly released into the eye as the shield dissolves. This method is capable of producing collagen or gelatin ophthalmic shields which completely dissolve leaving no residual material in the eye.

The collagen used to practice this invention can be obtained by known methods and from conventional sources, such as bovine or porcine hides or the skin or tendons of animals. Solubilized collagen can be obtained by means of enzyme extraction, acid extraction, base extraction or salt extraction. Collagen also can be recovered in fibrous form by dispersion of the collagen in an aqueous medium and recovery, e.g., by centrifugation. The specific steps used to recover collagen by solubilization or in fibrous form are described by Miyata, in U.S. Pat. No. 4,264,155, issued Apr. 28, 1981, the disclosure of which is incorporated herein by reference.

After the collagen has been solubilized, the collagen solution is treated to remove impurities and debris. Often this can be done by low gravity centrifugation, but methods, such as filtration, precipitation, solvent extraction, and other methods known in the art also can be used to advantage to remove contaminants. The collagen contained in the solution preferably is not substantially denatured by or during the purification steps. Typically, a solution of soluble collagen can be simply centrifuged in a clinical centrifuge at about 3,000 to 4,000 rpm for 10 to 20 minutes at a temperature from about 4° C. to about 20° C. to remove debris.

Reactive groups on the collagen can be chemically modified to enhance solubility, although such modification is not necessary. Chemical modification of the groups can be performed by acylation with acetic anhydride or other anhydrides, such as succinic anhydride. Esterification of the carboxyl groups can be carried out by standard reactions with acidified alcohol such as methanol or ethanol.

Other materials, such as fillers can be included in the collagen shield to give it the desired swell and flexible properties and to reduce brittleness. Examples of such materials include chondroitin sulfate, polyvinyl alcohol, glycerol, polyvinylpyrrolidone (PVP), povidone USP and the like. Such materials can be incorporated in any amount which does not adversely affect transparency of the resultant composition or cause loss of biocompatibility. Preferably, the additional material is added in amounts of about 0.01% to about 50% by weight but more preferably from about 0.9% to about 20% by weight.

The collagen gel advantageously has a collagen concentration ranging from about 1% to about 30% by weight. A preferred concentration is in the range from about 5% to about 15% by weight, with the balance being water, pharmaceutically active agents or fillers. After the collagen gel has been formed, it may contain air bubbles which can lead to a collagen shield having less than optimal properties. Bubbles which are present can be removed by centrifuging the collagen gel for about 2 to about 60 minutes at a temperature of from about 4° C. to about 20° C. at from about 3,000 to about 13,000 rpm forming a clear gel.

The collagen gel is placed in a double-sided mold to cast a collagen shield. Any suitable double-sided mold having complementary male and female halves can be used to practice this invention. The molds usually are made of polypropylene or polycarbonate, but double-sided molds composed of other suitable material can be employed. Generally, a drop of the collagen gel containing from about 0.1 to about 0.3 ml is placed on the surface of the concave, female part of the mold and the corresponding convex, male part is compressed onto the female half, thus forming a collagen shield.

The mold containing the collagen shield then is chilled to a temperature within a range of from about 4° C. to about $-200°$ C. employing liquid nitrogen or a conventional freezer until the collagen shield is strong enough to permit opening of the mold without deforming it. The time for chilling varies, depending upon the temperature at which the mold is chilled. Generally, if the mold is chilled in a freezer maintained at about $-20°$ C., the mold should be chilled for about 2-16 hours. If chilling is performed with liquid nitrogen, sufficient chilling can be accomplished in about 15-30 seconds. The chilling process gives the collagen shield dimensional stability and the requisite strength to allow opening of the mold.

Once the mold has been opened to expose the collagen shield, the shield is dried at a temperature ranging from about $-35°$ C. to less than 37° C. Any suitable method that is practiced in the art can be used to dry the collagen shield, such as air-drying, desiccation, vacuum-drying or slow humidified air-drying and the like. When the collagen shield is to be cross-linked with UV light, air drying at from about 4° C. to about room temperature, i.e. about 20° C., followed by vacuum desiccation, to be sure of complete drying, is the preferred method. Drying of the collagen shield at a temperature above the freezing point of the shield produces a transparent shield having the properties of a plastic film. Vacuum drying (i.e., lyophilization) of the collagen shield at a temperature below the freezing point of the shield produces a shield having a spongy texture. For some applications, the latter type of shield is preferred.

After drying, the collagen shield is cross-linked to provide strength and stability to control the dissolution time in the eye. The dry collagen shield possess sufficient strength and dimensional stability such that it can be removed from the mold prior to cross-linking. Preferably, the collagen shield is cross-linked in the mold. The collagen shield can be cross-linked by conventional methods practiced in the art. Cross-linking of the collagen shield can be carried out by irradiation with ultraviolet rays, by liquid or vapor phase chemical means, by heat cross-linking or by a combination of methods. Alternatively, the collagen shield can be cross-linked with gamma irradiation prior to drying. Irradiation or heat cross-linking is preferred to chemical treatment since they do not introduce toxic, foreign material into the collagen shield.

When irradiation is used (gamma rays or ultraviolet light) to cross-link a collagen shield, treatment should be carried out in a nitrogen atmosphere and the wavelength and dosage should be controlled in order to result in optimal product properties. The dosage depends upon the type of irradiation used, the composition of the collagen shield and/or the concentration of collagen in the gel. Irradiation of a dry shield can be carried out at low dosages in a BHK chamber (about 12–15 mWatts/cm$^2$ at about 1 inch, about 254–579 nm, filtered as desired, ozone free), illuminated at about 4 to 10 cm. from the source for about 4 to about 15 minutes depending on the size, thickness and composition of the shield desired. Irradiation of wet shields can be carried out in a Gammator M type gamma irradiator within a temperature range of from about $-20°$ C. to about 70° C.

Chemical cross-linking is carried out, as is practiced according to the art, by treatment of the collagen shield with such liquid or vapor phase agents such as formaldehyde, glutaraldehyde, acrolein, glyoxal, dialdehyde-starch, chromic acid, bifunctional reagents such as maleimide derivatives, alkyl and aryl halides and isocyanates. Optionally, the dry shields can be further vacuum desiccated to remove any excess reagents.

Optionally, a pharmaceutically active ophthalmic drug can be incorporated into the collagen shield. The desired drug to be incorporated into the collagen shield can be added to the solution or dispersion or to the collagen gel prior to casting. Various types of drugs can be incorporated into the collagen shield such as antivirals, antibiotics, antiinflammatory agents, mydriatics, growth factors and the like. For example, pilocarpine, atropine, dexamethasone, gentamicin, tobramycin, neomycin, kanamycin, tetracycline, idoxuridine, epidermal growth factor and the like can be incorporated into the collagen shield. The remaining steps in the formation of the collagen shield are carried out as described above.

Alternatively, dissolvable ophthalmic shields can be prepared from gelatin or a mixture of collagen and gelatin. The methods employed in preparing a dissolvable, gelatin ophthalmic shield are identical to the methods employed in preparing dissolvable, collagen ophthalmic shields. Gelatin is employed in concentrations ranging from about 1% to about 30% by weight. A preferred concentration is in the range from about 5% to about 15% by weight with the balance being water, fillers or ophthalmically active pharmaceuticals. When a dissolvable ophthalmic shield is cast from a mixture of collagen and gelatin, the collagen is employed in amounts ranging from about 0.5% to about 15% by weight, and gelatin ranges in amounts ranging from about 0.5% to about 15% by weight. Preferred collagen concentrations range from about 2.5% to about 14.5% by weight, and preferred gelatin concentrations range from about 2.5% to about 14.5% by weight. The collagen and gelatin are mixed together in solution form prior to casting an ophthalmic shield.

The gelatin employed in practicing this invention includes both Type A, derived from an acid-treated precursor, or Type B, derived from an alkali-treated precursor. Gelatin used to practice this invention can be obtained by partial hydrolysis of collagen derived from the skin, white connective tissues or bones of animals. Preferably, the gelatin is in liquid form when mixed with collagen, but if it is in solid form, the gelatin can be readily dissolved in warm water.

The novel method of the present invention enables the preparation of a molded collagen or gelatin shield with a controlled degree of cross-linking and with lower salt or acid residues than can be obtained in other methods. The collagen or gelatin shield of the present invention has excellent visual properties and dissolves in physiological fluids. Dissolvable, ophthalmic shields prepared according to the method of the present invention are clear and can be comfortably placed on the eye. An ophthalmic drug as well as fillers can be incorporated into the ophthalmic shield. As the collagen or gelatin shield slowly dissolves, the ophthalmic drug is released. The user need not be concerned with repeated doses or missing a dose. Further, the collagen or gelatin shield will completely dissolve and the user need not worry about removing the residue left over by the ophthalmic shield.

This invention is further illustrated by the following examples, which are not intended to be limiting.

EXAMPLES 1-12

Twelve collagen shields were prepared from 10% Semed S Collagen. Twelve samples of 10% Semed S Collagen were mixed with an acidic solution of acetic acid and HCL at a pH of about 2-3. Eleven of the samples were mixed in a mortar and pestle while sample 3 was mixed in a homogenizer. To sample 6, was added 2% glycerol by weight of gelatin as a filler. To sample 7, 2% chondroitin sulfate was added by weight of collagen. To samples 8 and 9, 10% PVP by weight of collagen was added. Additionally, 2% glycerol by weight of collagen was added to sample 9. Each of the twelve samples was centrifuged for 10 minutes at about 13,000 rpm at about 4° C. to remove any bubbles in the samples and to assure uniformity in the mixture. A drop (about 0.2-0.3 ml) from each of the twelve samples was placed on the female half of twelve individual double sided molds. The male halves then were placed on top of the female halves, and were pressed together to form a collagen shield. Each mold, except for sample eleven, was placed into liquid nitrogen for about 15 seconds to give dimensional stability to the collagen shield. Sample eleven was placed in a freezer at about −20° C. for about 10 hours. After the collagen shields had been frozen within their respective molds, the molds were opened, and the portion of the molds containing collagen shields were dried. Samples 1, 2, 3 and 6-12 were dried at 4° C. under an air flow hood. Sample 4 was dried over night at room temperature followed by vacuum desiccation, and sample 5 was dried under a vacuum at room temperature.

After each collagen shield had been dried, each was cross-linked. Collagen shields 1 and 3-11 were cross-linked with UV light for 4 minutes in a BHK chamber. Collagen shields 2 and 12 also were cross-linked with UV light in a BHK chamber but were exposed to UV light for longer periods of time (6 minutes and 10 minutes, respectively). The resulting collagen shields all showed excellent biosolubility properties in physiological fluids with no residue observable after one week.

EXAMPLE 13

Fresh calf skin (about 5 kg) is dehaired, cleaned by shaving and cut into small pieces. The skin is solubilized in 10 liters of water (pH 2.5 0.1M HCl) by addition of 8 gm of pepsin (approximate ratio of enzyme to collagen is about 1/50) and is kept at 20° C. for five days with intermittent stirring. The resulting viscous solubilized collagen is filtered through cheesecloth, its pH adjusted to 10 by 0.1M NaOH and allowed to stand for 24 hours at 4° C. to inactivate the pepsin. The pH of the collagen then is adjusted to about 7 to 8 with 0.1M HCl, and the collagen precipitate is collected by repeating redissolution in acidic aqueous solution and then reprecipitated at pH 7 and stored as lyophilized powder.

The collagen is resolubilized to a 10% slurry with a dilute solution of acetic acid and HCl at a pH of about 2-3. The slurry is thoroughly mixed with a mortar and pestle and allowed to sit at 4° C. for about one hour to form a gel. As air bubbles are generally present in the gel, the gel is centrifuged in a centrifuge tube at about 4° C. at 13,000 rpm for about 2-10 minutes to remove any air bubbles and to assure uniformity of the gel.

On a female concave section of a double-sided mold, is placed a drop (about 0.2-0.3 ml) of collagen gel, and the upper male convex part of the mold is pushed onto the lower female half containing the collagen gel to cause the gel to spread forming a shield. The entire mold then is placed in a freezer maintained at about −20° C. for about 10 hours or the mold can be placed into liquid nitrogen for about 15 seconds to give dimensional stability to the collagen shield and to allow the two halves of the mold to be separated easily.

After freezing, the double-sided mold then is opened leaving the collagen shield in one portion of the mold. The chilled mold containing the exposed collagen shield then is placed in a 4° C. chamber open to the air and either air dried or placed in a vacuum chamber to effect complete drying. The collagen shield then is cross-linked with UV light in a BHK chamber at about 6 inches for about 4-10 minutes resulting in a thin collagen shield. The resulting collagen shield shows excellent biosolubility properties and should completely dissolve on an eye, with no residue observable on a subject's eye after one week.

Having described the invention in detail, we claim:

1. A method of casting a dissolvable ophthalmic shield, comprising the steps of:
   a. forming a viscous collagen and/or gelatin gel;
   b. placing the gel in a double-sided mold;
   c. closing the mold to cast the gel into the form of a shield;
   d. chilling the mold to a temperature sufficiently low to effect sufficient dimensional stability and to allow separation of the mold halves without deforming the shield;
   e. opening the chilled mold while leaving the shield in one portion of the mold;
   f. drying the shield; and
   g. partially cross-linking the shield to obtain a shield that dissolves under physiological conditions in the eye.

2. The method according to claim 1, wherein the gel has a collagen concentration ranging from about 1% to about 30% by weight of the gel.

3. The method according to claim 2, wherein the gel has a collagen concentration ranging from about 5% to about 15% by weight of the gel.

4. The method according to claim 1, wherein the gel has a gelatin concentration ranging from about 1% to about 30% by weight of the gel.

5. The method according to claim 1, wherein the gel has a collagen concentration of about 2.5% to about 14.5% by weight and a gelatin concentration of about 2.5% to about 14.5% by weight of the gel.

6. The method according to claim 1, wherein a filler is incorporated into the gel.

7. The method according to claim 6, wherein the filler comprises polyvinylpyrrolidone, povidone, glycerol, chondroitin sulfate or polyvinyl alcohol.

8. The method according to claim 1, wherein the gel is centrifuged prior to adding the gel to the mold for about 2 to about 60 minutes at a temperature of from about 4° C. to about 20° C. at about 3,000 to about 13,000 rpm to form a semi-clear gel free of bubbles.

9. The method according to claim 1, wherein the mold comprising the shield is chilled to a temperature of from about 4° C. to about −200° C.

10. The method according to claim 1, wherein the drying process comprises air-drying, desiccation, vacuum drying or slow humidified air-drying within a temperature range of from about −35° C. to less than 37° C.

11. The method according to claim 1, wherein the ophthalmic shield is cross-linked by irradiation.

12. The method according to claim 11, wherein the ophthalmic shield is cross-linked by irradiation with ultraviolet rays.

13. The method according to claim 11, wherein the ophthalmic shield is cross-linked by irradiation with gamma rays prior to drying the ophthalmic shield.

14. The method according to claim 1, wherein the ophthalmic shield is cross-linked by chemical means.

15. The method according to claim 1, wherein the ophthalmic shield is cross-linked by irradiation and chemical means.

16. The method according to claim 1, wherein the gelatin shield is cross-linked under vacuum at about 4° C. to about 200° C.

17. The method according to claim 1, comprising the further step of adding a pharmaceutically active agent selected from the group consisting of an antibiotic, an anti-inflammatory, an antiviral, a mydriatic and a growth factor prior to casting the collagen and/or gelatin shield.

18. The method according to claim 17, wherein the pharmaceutically active agent is at least one of the following drugs: atropine, pilocarpine, dexamethasone, gentamicin, tobramycin, neomycin, kanamycin, tetracycline, idoxuridine or epidermal growth factor.

19. A method of casting a dissolvable collagen shield comprising the steps of:
   a. forming a viscous collagen gel having a collagen concentration of about 10% by weight of the gel;
   b. incorporating fillers therein to give the desired swell and properties;
   c. centrifuging the collagen gel for about 5 to 10 minutes at about 4° C. to about 15° C. at about 3,000 to about 13,000 rpm to form a semi-clear collagen gel free of bubbles;
   d. placing a drop of the collagen gel on the female half of a double-sided mold;
   e. casting the collagen shield by placing the complementary male half of the double-sided mold onto the female half with the collagen gel and compressing the two halves together forming a collagen shield;
   f. chilling the double-sided mold with the collagen shield in liquid nitrogen to effect dimensional stability to the collagen shield;
   g. separating the two halves of the double-sided mold while leaving the collagen shield in one portion of the mold;
   h. drying the collagen shield by air drying at from about 4° C. to about room temperature followed by vacuum desiccation to allow reproducible properties; and
   i. partially cross-linking the collagen shield by employing a sufficient amount of UV light to obtain a collagen shield that dissolves under physiological conditions in the eye and can be placed on an eye.

20. The method according to claim 19, wherein the fillers comprise chondroitin sulfate, glycerol, polyvinylpyrrolidone or povidone.

21. The method according to claim 19, comprising the further step of incorporating a pharmaceutically active agent into the collagen gel prior to casting the collagen shield.

22. The method according to claim 21, wherein the pharmaceutically active agent comprises an antibiotic, an antiviral, an anti-inflammatory, a mydriatic or a growth factor.

23. The method according to claim 22, wherein the pharmaceutically active agent is at least one of the following drugs: pilocarpine, atropine, dexamethasone, gentamicin, tobramycin, neomycin, kanamycin, tetracycline, idoxuridine or epidermal growth factor.

24. The method according to claim 1, wherein the gel has a collagen concentration of about 0.5 to 15% by weight and a gelatin concentration of about 0.5 to 15% by weight.

* * * * *

UNITED STATES PATENT AND TRADEMARK OFFICE
CERTIFICATE OF CORRECTION

PATENT NO. : 5,259,998
DATED : November 9, 1993
INVENTOR(S) : Cary Reich et al

It is certified that error appears in the above-indentified patent and that said Letters Patent is hereby corrected as shown below:

Col. 7, line 24, after "to" insert --a predetermined extent--.

Signed and Sealed this

Tenth Day of May, 1994

Attest:

BRUCE LEHMAN

*Attesting Officer*     *Commissioner of Patents and Trademarks*